(12) United States Patent
Johnson et al.

(10) Patent No.: US 10,513,033 B2
(45) Date of Patent: Dec. 24, 2019

(54) ROBOT QUEUING IN ORDER FULFILLMENT OPERATIONS

(71) Applicant: Locus Robotics Corp., Wilmington, MA (US)

(72) Inventors: Michael Charles Johnson, Ashland, MA (US); Sean Johnson, Danvers, MA (US); Bradley Powers, Lowell, MA (US); Kaitlin Margaret Gallagher, Lawrence, MA (US)

(*) Notice: Subject to any disclaimer, the term of this patent is extended or adjusted under 35 U.S.C. 154(b) by 0 days.

(21) Appl. No.: 15/697,759

(22) Filed: Sep. 7, 2017

(65) Prior Publication Data

US 2018/0043533 A1 Feb. 15, 2018

Related U.S. Application Data

(63) Continuation-in-part of application No. 15/628,751, filed on Jun. 21, 2017, which is a continuation of
(Continued)

(51) Int. Cl.
*B25J 9/16* (2006.01)
*G05D 1/02* (2006.01)
(Continued)

(52) U.S. Cl.
CPC .......... *B25J 9/1666* (2013.01); *G05D 1/0297* (2013.01); *G06Q 10/047* (2013.01); *G06Q 10/063* (2013.01); *G06Q 10/087* (2013.01); *G06Q 30/0601* (2013.01); *G05B 2219/39082* (2013.01); *G05B 2219/40317* (2013.01); *G05D 2201/0216* (2013.01); *Y10S 901/01* (2013.01)

(58) Field of Classification Search
CPC ............. B25J 9/1666; G05D 1/0297; G05D 2201/0216; G06Q 10/047; G06Q 10/063; G06Q 10/087; G06Q 30/0601; Y10S 901/01; G05B 2219/40317; G05B 2219/39082
USPC ........................................................ 700/248
See application file for complete search history.

(56) References Cited

U.S. PATENT DOCUMENTS 8,538,692 B2 * 9/2013 Wurman ................ G06Q 10/08
340/988
9,008,827 B1 4/2015 Dwarakanath et al.
(Continued)

FOREIGN PATENT DOCUMENTS

CN 102016893 A 4/2018

OTHER PUBLICATIONS

International Search Report with Written Opinion, dated Aug. 29, 2018, received in international patent application No. PCT/US2018/038674, 10 pages.
(Continued)

*Primary Examiner* — Michael Collins
(74) *Attorney, Agent, or Firm* — Verrill; John W. Powell

(57) ABSTRACT

A method for queuing robots destined for one or more target locations in an environment, includes determining if a plurality of robots destined for the one or more target locations have entered a predefined target zone proximate the one or more target locations. The method also includes assigning each of the robots to either its target location or one of a plurality of queue locations based on an assigned priority. The plurality of queue locations are grouped into one or more queue groups.

18 Claims, 13 Drawing Sheets

Related U.S. Application Data application No. 15/081,124, filed on Mar. 25, 2016, now Pat. No. 9,776,324.

(51) Int. Cl.
    *G06Q 10/04*     (2012.01)
    *G06Q 10/06*     (2012.01)
    *G06Q 10/08*     (2012.01)
    *G06Q 30/06*     (2012.01)

(56) References Cited

U.S. PATENT DOCUMENTS

| | | |
|---|---|---|
| 9,519,882 B2 | 12/2016 | Galluzzo |
| 9,776,324 B1 * | 10/2017 | Johnson ................ B25J 9/1666 |
| 10,022,867 B2 * | 7/2018 | Saboo ................... G06Q 50/28 |
| 10,089,586 B2 * | 10/2018 | Vestal ............ G06Q 10/063114 |
| 2011/0000082 A1 | 1/2011 | Yamashita |
| 2012/0152877 A1 * | 6/2012 | Tadayon ................... B25J 5/02 |
| | | 212/224 |
| 2013/0317642 A1 | 11/2013 | Asaria |
| 2015/0332213 A1 * | 11/2015 | Galluzzo ................. B25J 5/007 |
| | | 700/216 |
| 2015/0367513 A1 * | 12/2015 | Gettings ............... G06Q 10/06 |
| | | 700/248 |
| 2016/0129592 A1 * | 5/2016 | Saboo ................... G06Q 50/28 |
| | | 700/248 |

OTHER PUBLICATIONS

International Search Report with Written Opinion, dated Aug. 29, 2018, received in international patent application No. PCT/US2018/038695,11 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| | Location | Fiducial ID |
|---|---|---|
| 400 | | ← 404 |
| 402a | L01001A | 11 |
| 402b | L01001B | 11 |
| 402c | L01001C | 11 |
| 402d | L01001D | 11 |
| 402e | L01001E | 11 |
| 402f | L01001F | 11 |
| | L01002A | 12 |
| | L01002B | 12 |
| | L01002C | 12 |
| | L01002D | 12 |
| | L01002E | 12 |
| | L01003A | 13 |
| | L01003B | 13 |
| | L01003C | 13 |
| | L01003D | 13 |
| | L01003E | 13 |
| | L01003F | 13 |
| | L01004A | 14 |
| | L01004B | 14 |
| | L01004C | 14 |
| | L01004D | 14 |
| | L01004E | 14 |
| | L01005A | 15 |
| | L01005B | 15 |
| | L01005C | 15 |
| | L01005D | 15 |
| | L01005E | 15 |
| | L01005F | 15 |

FIG. 7

ROBOT QUEUING IN ORDER FULFILLMENT OPERATIONS

CROSS-REFERENCE TO RELATED APPLICATION(S)

This application is a continuation in part of U.S. application Ser. No. 15/628,751, filed on Jun. 21, 2017, which is a continuation of U.S. application Ser. No. 15/081,124, filed on Mar. 25, 2016, and issued as U.S. Pat. No. 9,776,324 on Oct. 3, 2017, the contents of each above-referenced application are incorporated herein by reference in their entirety.

FIELD OF THE INVENTION

This invention relates to robot-assisted product order-fulfillment systems and methods and more particularly to queuing of robots destined for a common location(s) using one or more queue groups.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

With numerous robots navigating a space it is very possible and even likely that robots will attempt to navigate to a position that is occupied by another robot, resulting in a race condition. Race conditions are when two robots are attempting to get to the same place and become processor bound as they attempt to reconcile the changing external environment. Race conditions are very undesirable and can result the robots being unable to perform further operations until the condition is resolved.

BRIEF SUMMARY OF THE INVENTION

In one aspect the invention features a method for queuing robots destined for one or more target locations in an environment. The method includes determining if a plurality of robots destined for the one or more target locations have entered a predefined target zone proximate the one or more target locations. The method also includes assigning each of the robots to either its target location or one of a plurality of queue locations based on an assigned priority. The plurality of queue locations are grouped into one or more queue groups.

In other aspects of the invention one or more of the following features may be included. The environment may be a warehouse space containing items for customer order fulfillment. The assigned priority may be determined by the order of entry of each of the plurality of robots into the target zone, and wherein the first robot to enter the target zone is assigned the highest priority. The assigned priority may be determined by one or both of the order of entry of each of the plurality of robots into the target zone and an order priority associated with a customer order to be processed by each of the plurality of robots. The order priority may be associated with the customer order to be processed by each of the plurality of robots is determined by one or more of the following: shipping priority, item type, customer type, or retailer. The plurality of queue locations may be grouped into at least two queue groups spaced from each other in the environment. There may be included a first plurality of queue locations in a first group and a second plurality of queue locations in a second queue group, wherein the first plurality of queue locations in the first group and a second plurality of queue locations in a second queue group are all associated with one target location. The plurality of queue locations may be grouped into one queue group and the plurality of queue locations may be associated with a plurality of target locations. The first plurality of queue locations in the first group and a second plurality of queue locations in a second queue group may be associated with a plurality of target locations. The one or more target locations and the plurality of queue locations may be each defined by a pose to which the robot is capable of navigating.

In yet another aspect, the invention features a robot capable of navigating to predefined locations in an environment containing a plurality of other robots; the robot and the plurality of other robots capable of interacting with a management system. The robot includes a mobile base and a communication device enabling communication between the robot and the management system. There is a processor, responsive to communications with the management system, configured to navigate the robot to a target location in the environment. The processor is also configured to determine if at least one of the plurality of other robots occupies the target location. If it is determined that at least one of the plurality of other robots occupies the target location, the processor determines if the robot has entered a predefined target zone proximate the target location. If it is determined that the robot has entered the predefined target zone, the processor is configured to assign the robot to one of a plurality of queue locations based on an assigned priority. The plurality of queue locations are grouped in one or more queue groups.

In further aspects of the invention one or more of the following features may be included. The environment may be a warehouse space containing items for customer order fulfillment. The assigned priority may be determined by the order of entry of each of the plurality of robots into the target zone. The first robot to enter the target zone may be assigned the highest priority. The assigned priority may be determined by one or both of the order of entry of each of the plurality of robots into the target zone and an order priority associated with a customer order to be processed by each of the plurality of robots. The order priority associated with the customer order to be processed by each of the plurality of robots may be determined by one or more of the following: shipping priority, item type, customer type, or retailer. The plurality of queue locations may be grouped into at least two queue groups spaced from each other in the environment. There may be a first plurality of queue locations in a first group and a second plurality of queue locations in a second queue group, wherein the first plurality of queue locations in the first group and a second plurality of queue locations in a second queue group may be all associated with one target location. The plurality of queue locations may be grouped into one queue group and the plurality of queue locations may be associated with a plurality of target locations. The first plurality of queue locations in the first group and a second plurality of queue locations in a second queue group may be associated with a plurality of target locations. The one or more target locations and the plurality of queue locations may be each defined by a pose to which the robot is capable of navigating.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION OF INVENTION

Figure 1:
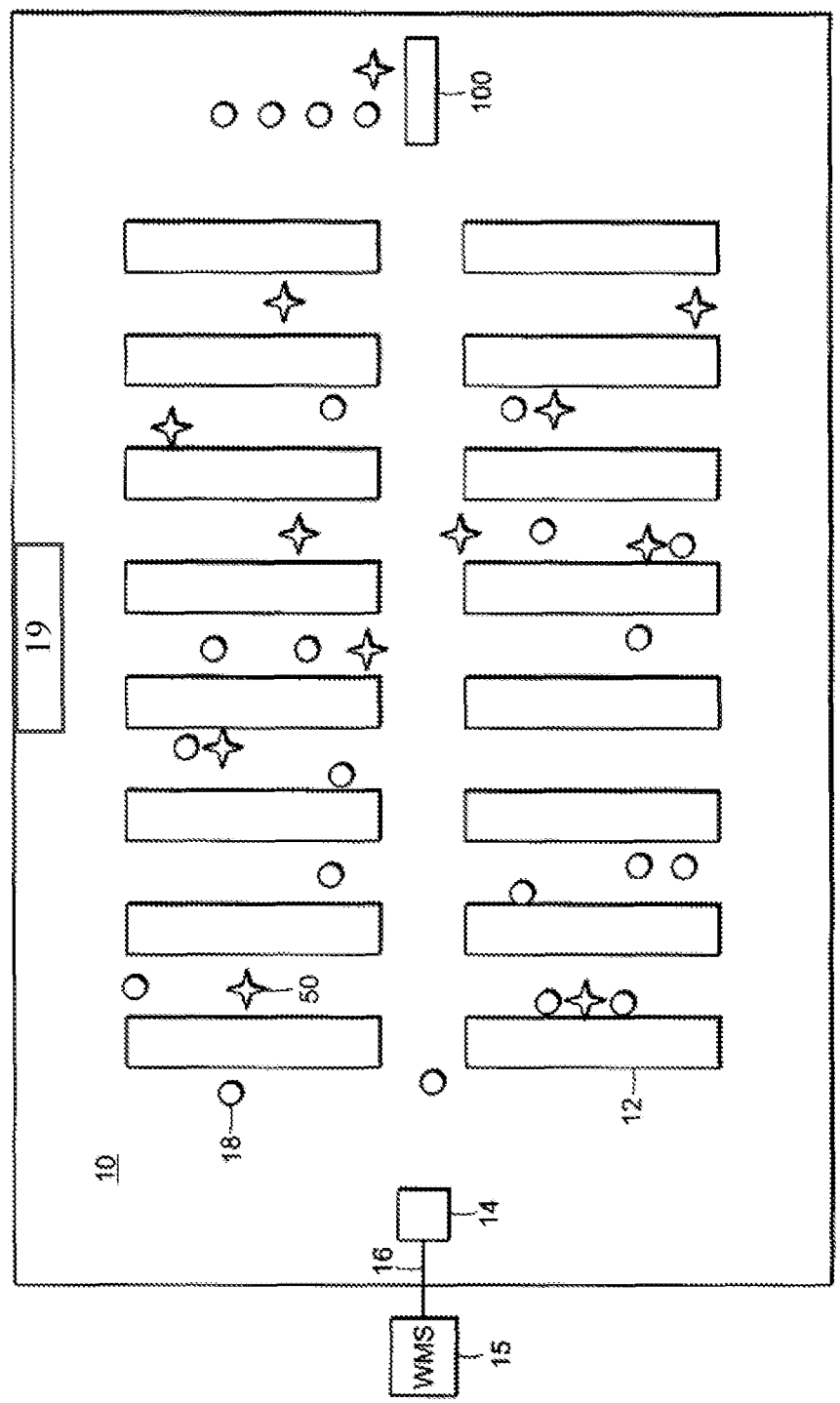
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to a system and method for queuing robots destined for a common target location. Although not restricted to any particular robot application, one suitable application that the invention may be used in is order fulfillment. The use of robots in this application will be described to provide context for the system and method for queuing robots but is not limited to that application.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
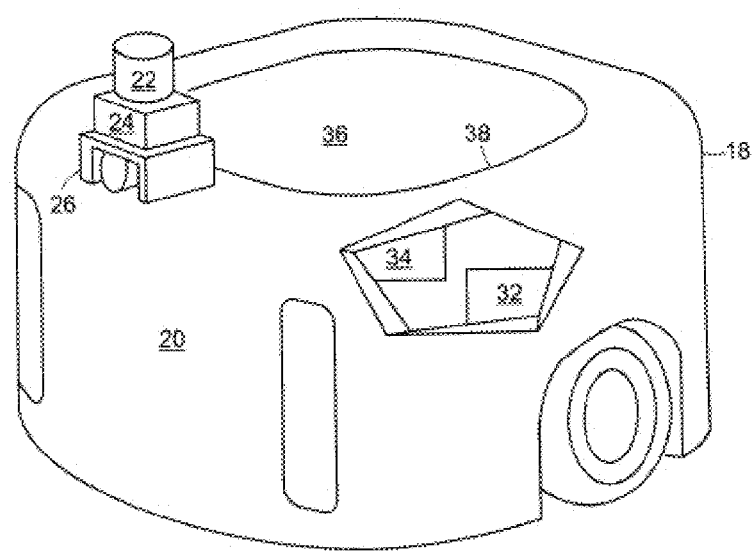
FIG. 2 is a perspective view of a base of one of the robots used in the warehouse shown in FIG. 1.
Figure 3:
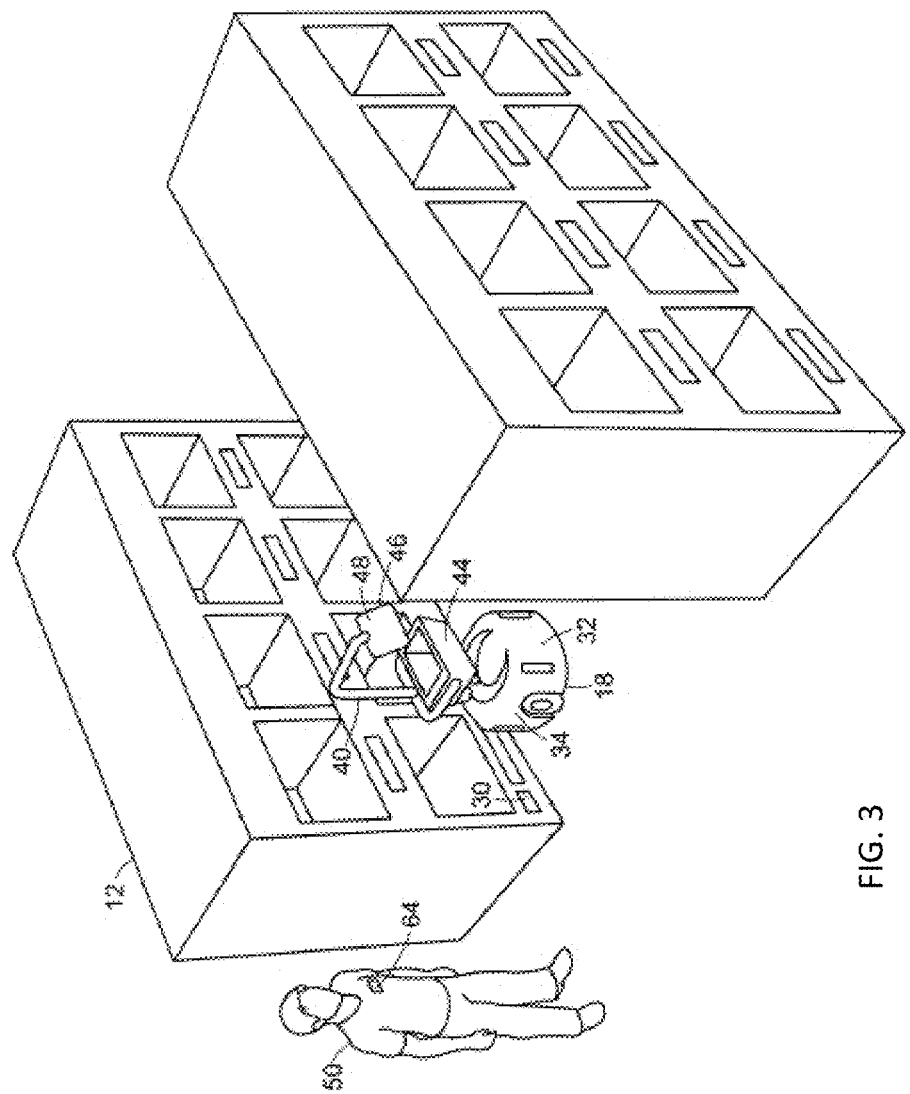
FIG. 3 is a perspective view of the robot in FIG. 2 outfitted with an armature and parked in front of a shelf shown in FIG. 1.

In a preferred embodiment, a robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

As described in more detail below, robots 18 can be utilized to perform multiple tasks of different task types in an interleaved fashion. This means that robot 18, while executing a single order traveling throughout the warehouse 10, may be picking items, placing items, and performing inventory control tasks. This kind of interleaved task approach can significantly improve efficiency and performance.

Referring again to FIG. 2, An upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one of the robots 18 navigates the warehouse and builds a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
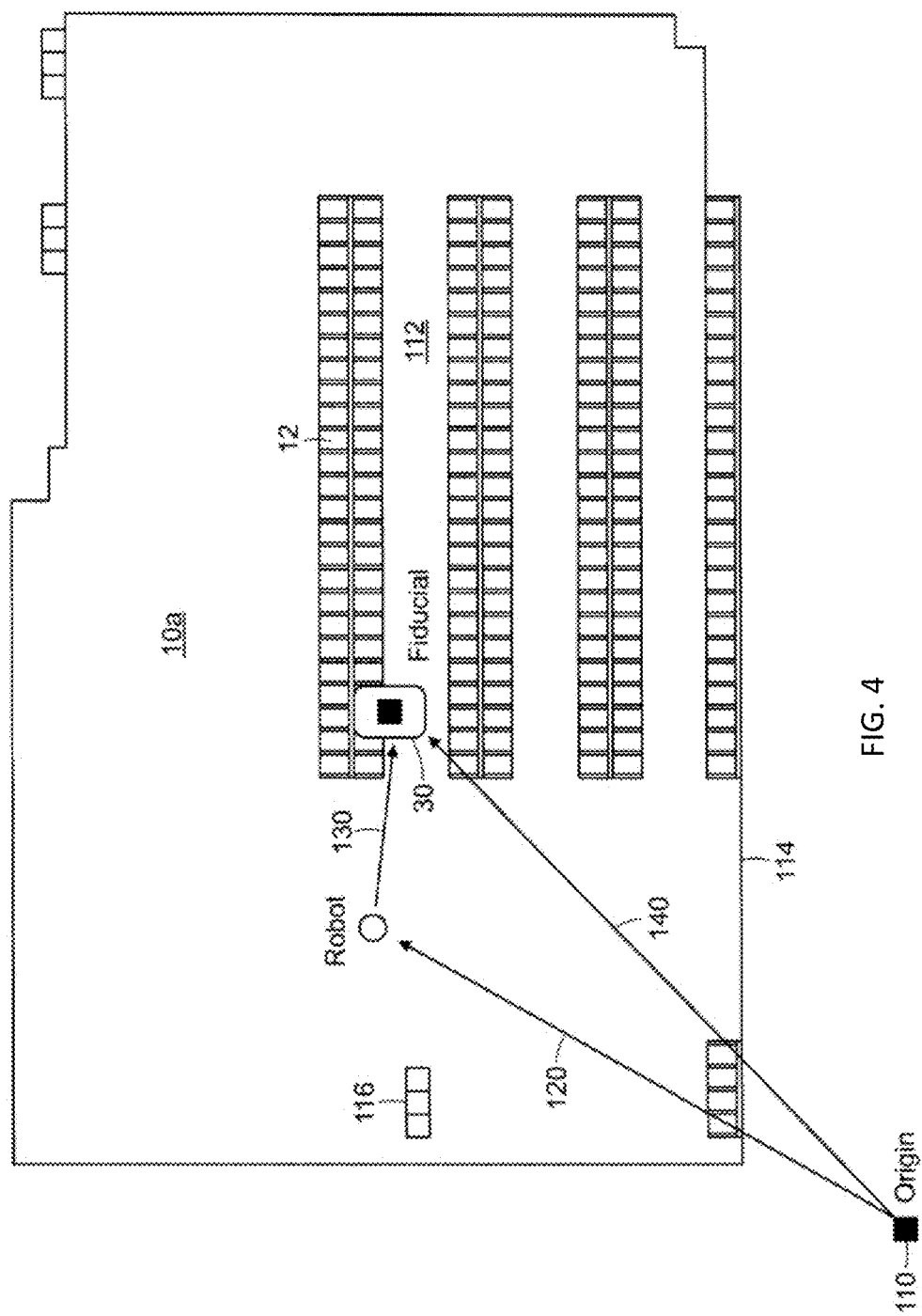
FIG. 4 is a partial map of the warehouse of FIG. 1 created using laser radar on the robot.

While constructing the map 10a or thereafter, one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
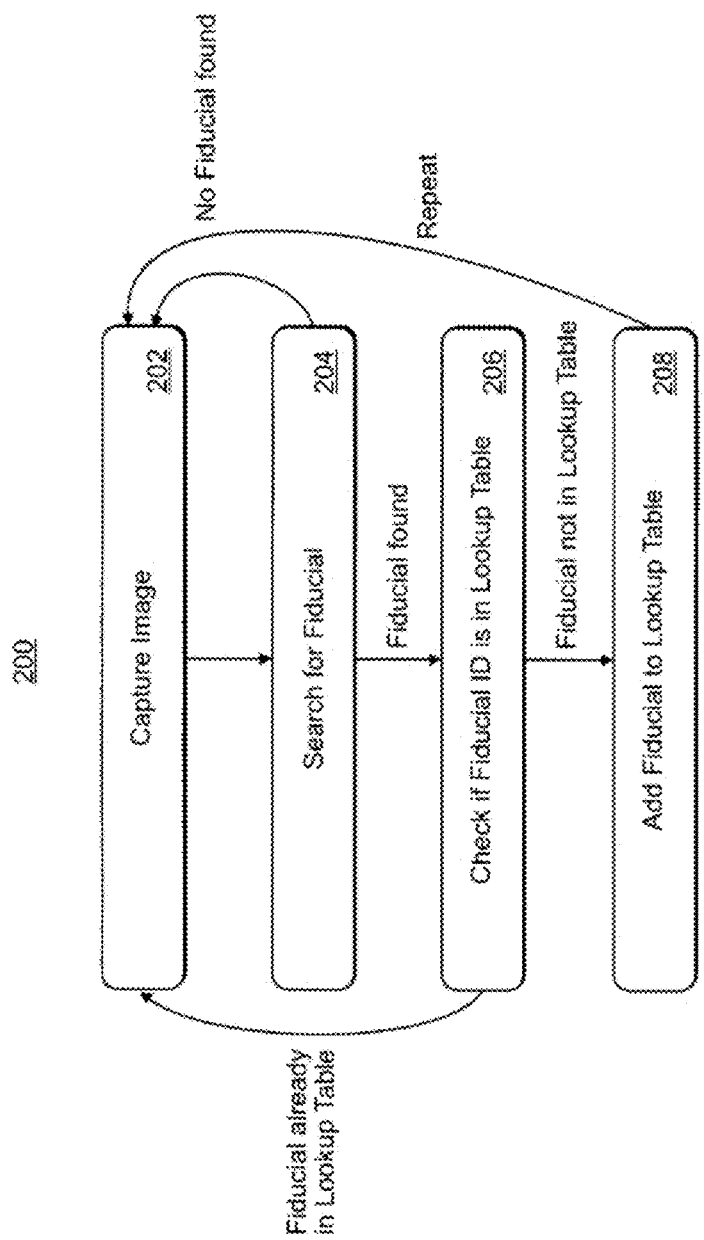
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
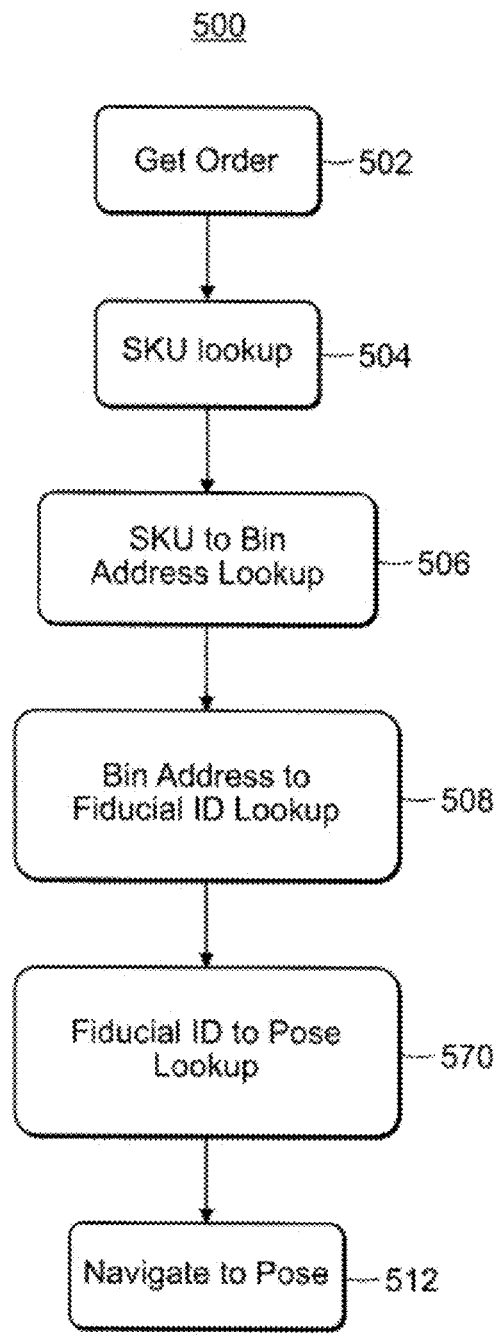
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Figure 9:
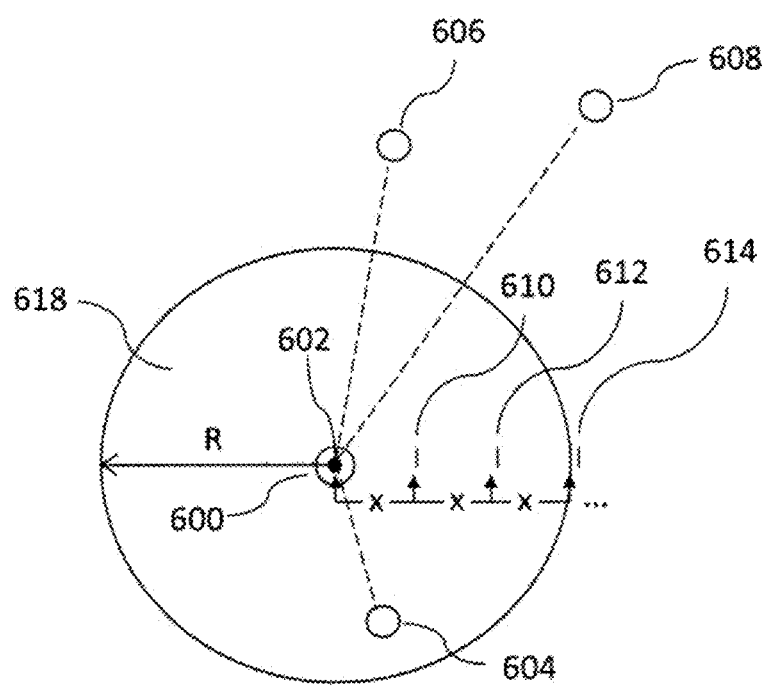
FIG. 9 is a schematic view of the target and queue locations used in the queuing process according to an aspect of this invention.

As described above, a problem that can arise with multiple robots navigating a space is called a "race condition", which can occur if one or more robots attempt to navigate to a space occupied by another robot. With this invention, alternative destinations for the robots are created to place them in a queue and avoid race conditions from occurring. The process is depicted in FIG. 9, where robot 600 is shown positioned at a target location/pose 602. Pose 602 could correspond to any location in a warehouse space, for example, a packing or loading station or a position near a particular bin. When other robots try to navigate to pose 602, such as robots 604, 606, and 608 (as indicated by the dotted lines from the robots and terminating at pose 602) they are redirected to temporary holding locations, such as locations or queue slots 610, 612, and 614.

Queue slots or locations 610, 612, and 614 are offset from pose 612. In this example queue slot 610 is offset from pose 602 by a distance x, which could be, for example, one (1) meter. Queue slot 612 is offset from queue slot 610 by an additional distance x and queue slot 614 is offset another distance x from queue slot 612. While, in this example, the distances are uniformly spaced along a straight line emanating from pose 602, this is not a requirement of the invention. The locations of the queue slots may be non-uniform and variable given the dynamic environment of the warehouse. The queue slots maybe offset according to a queuing algorithm that observes the underlying global map and the existing obstacles and constraints of the local map. The queuing algorithm may also consider the practical limits of queuing in the space proximate the target location/pose to avoid blocking traffic, interfering with other locations, and creating new obstacles.

In addition, the proper queue slotting of robots into the queue must be managed. In the example shown in FIG. 9, the robot with the first priority to occupy the pose 602 is queued in the first queue slot 610, while the other robots are queued in the other queue slots based on their respective priorities. Priorities are determined by the order of the robots' entry into a zone 618 proximate pose 602. In this case, zone 618 is defined by a radius, R, about pose 602, which in this case is approximately three (3) meters (or 3×). The first robot to enter the zone, in this case 604, has the highest priority and is assigned the first queue slot, queue slot 610. When robot 606, which is closer to zone 618 than robot 608, enters zone 618, assuming that robot 600 is still at pose 602 and robot 604 is located at queue slot 610, it has the next highest priority and it is therefore assigned queue slot 612. When robot 608 then enters zone 618, assuming that robot 600 is still at pose 602 and robots 604 and 606 are still located at queue slots 610 and 612, respectively, it is assigned to queue slot 614.

When robot 600 moves from pose 602 (target location), robot 604 moves from queue slot 610 to pose 602. Robots 606 and 608 move to queue slot positions 610 and 612, respectively. The next robot to enter zone 618 would be positioned in queue slot position 614. Of course, additional number of queue slot positions could be included to accommodate expected traffic flows.

The manner in which the robots are navigated to the queue slots and ultimately the target location is accomplished by temporarily redirecting them from the pose of the target location to the pose(s) of the queue slot(s). In other words, when it is determined that a robot must be placed in a queue slot, its target pose is temporarily adjusted to a pose corresponding to the location of the queue slot to which it is assigned. As it moves up in position in the queue, the pose is again adjusted temporarily to the pose of the queue slot with the next highest priority until it is able to reach its original target location at which time the pose is reset to the original target pose.

Figure 10:
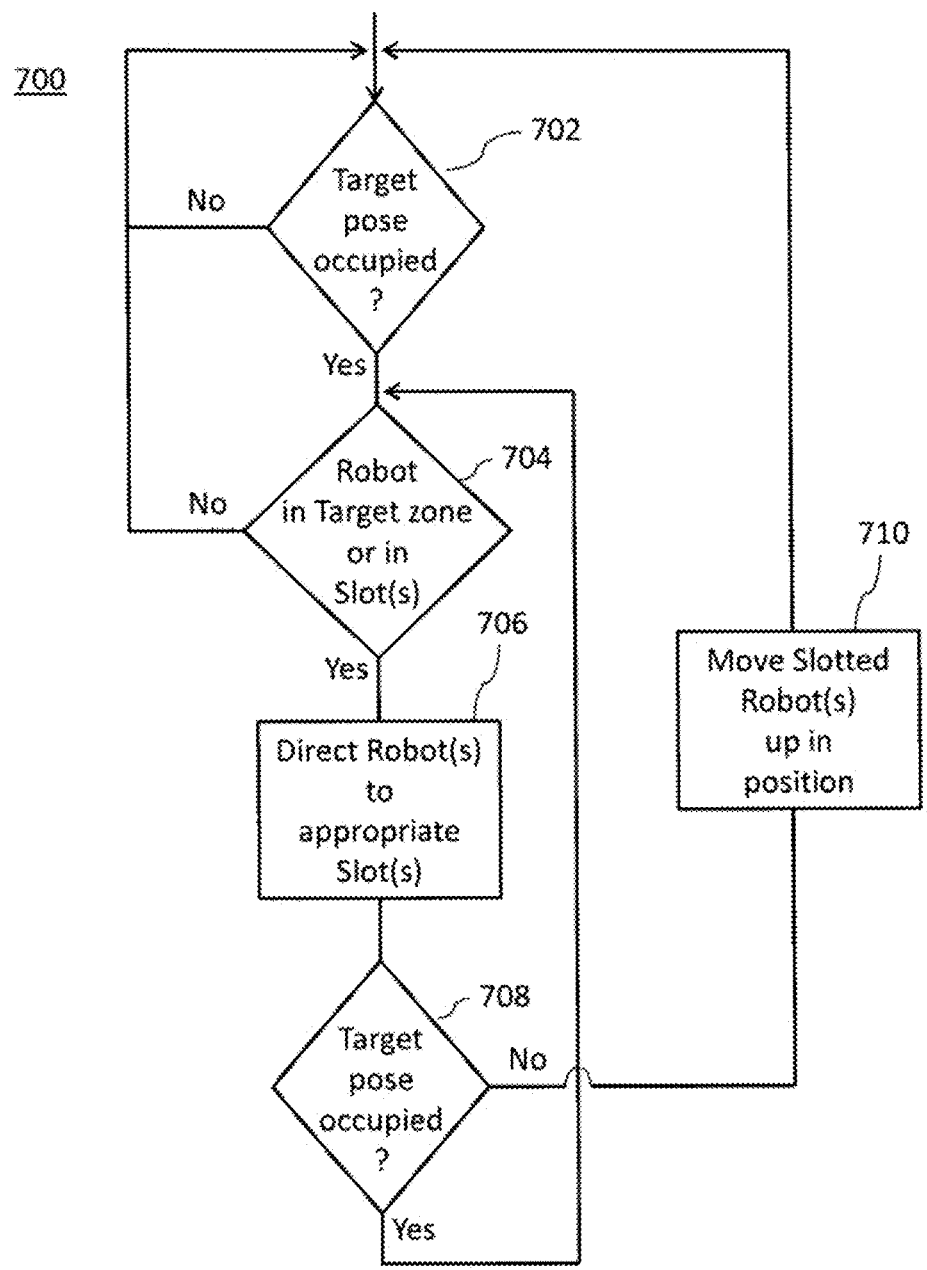
FIG. 10 is a flow chart depicting the robot queuing process according to an aspect of this invention.

Flow chart 700, FIG. 10, depicts the robot queuing process implemented by WMS 15 for a particular pose (target pose) within the warehouse. At step 702, it is determined if the target pose is occupied by a robot. If it is not, the process returns to step 702 until there is a robot occupying the target pose. When a robot is occupying the target pose, the process determines at step 704 if there is another robot in the target zone or if there is a robot in one or more of the queue slots. If it is determined that there is no robot in the target zone or in one or more queue slots, the process returns to step 702. If it is determined that there is a robot occupying the target pose or if the queue slot(s) is/are occupied, then at step 706 the robots are assigned to the appropriate queue slots.

If there is a robot in the target zone but no robot in the queue slots, then the robot in the target zone is directed to occupy the first queue slot, i.e. queue slot 610, FIG. 9. If there is a robot in the target zone and a robot (or multiple robots in the queue slots) then the robot in the target zone is slotted into the next available queue slot, as described above. If there is no robot in the target zone but there is/are robot(s) in the queue slot(s), then the slotted robots remain in the same positions. At step 708, if it is determined that the target pose is not occupied, then the robots in the queue slots are moved up a position, i.e. queue slot 610 to the target pose, queue slot 612 to queue slot 610 and so forth. If the target pose is still occupied, the process returns to step 704.

Figure 11:
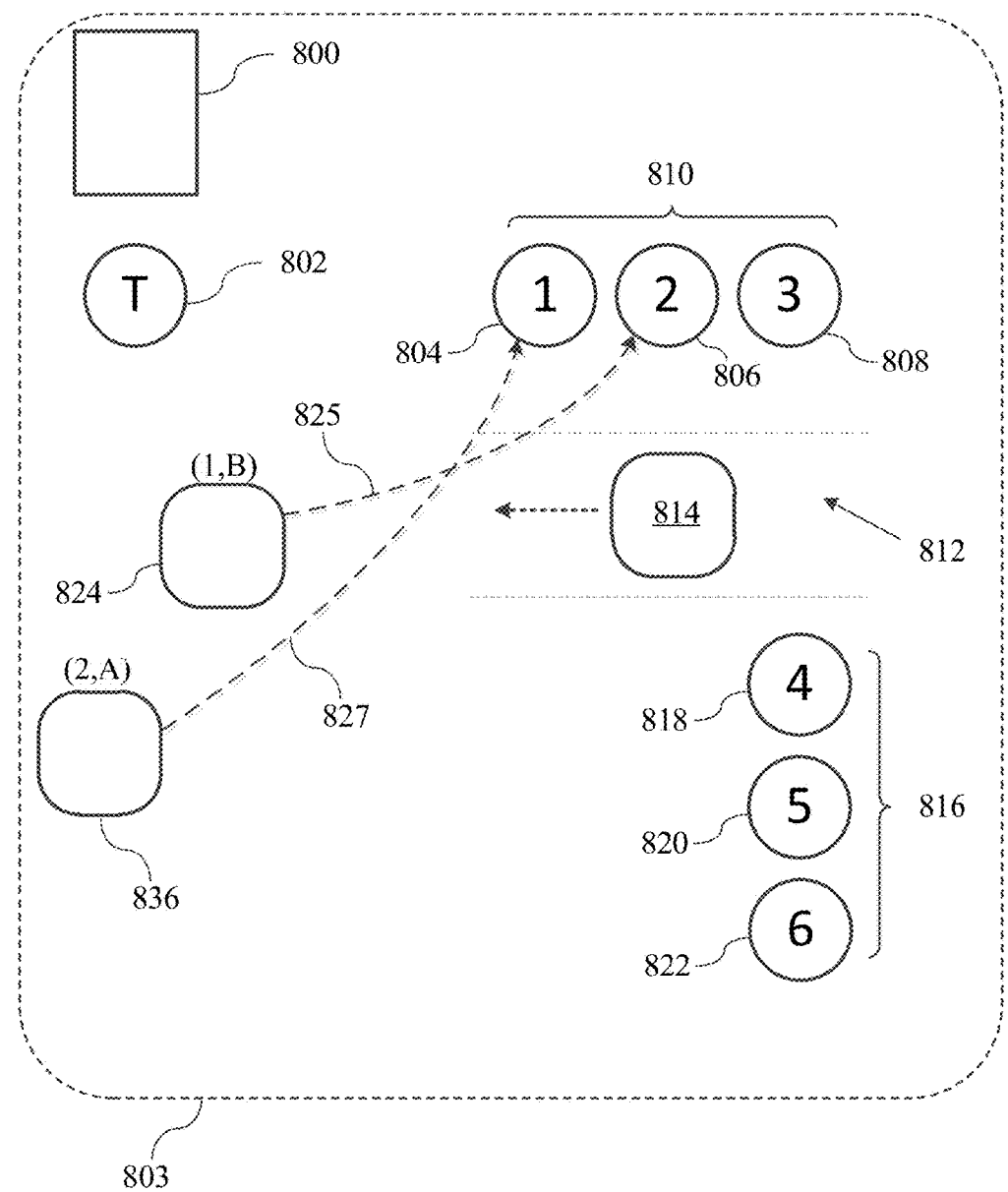
FIG. 11 is a schematic view of the target and queue locations according to another aspect of this invention with robots being directed to designated queue locations based on assigned priorities.

In FIG. 9, the queue locations 610, 612, and 614 are in line and adjacent to each other. This is acceptable for many situations, but in areas within a warehouse environment where there is limited space or heavy traffic or when many queue locations are needed, it may be desirable to utilize a "split" queue. An example of this is shown in FIG. 11. Here, a station 800 having a target location 802 is shown. Station 800 may be an induction station attended by an operator where a robot is assigned a customer order to fill and provided with a tote to carry the order or it may be a packing station where the robot is dropping off a customer order for packing and shipment by an operator. The target location does not need to be associated with a station, but it is a typical situation where multiple robots may be simultaneously vying for a common target location.

Referring again to FIG. 11, queue locations 804, 806 and 808 are part of a first queue group 810 and are shown spaced from target location 802. In this example, additional queue locations are required, but there is limited space as queue group 810 is adjacent to a busy path of traffic traversed by robots, such as robot 814, and operators. To overcome this issue, there is formed a second queue group 816, including additional queue locations 818, 820, and 822, physically spaced from queue group 810 across path 812. The queue locations in the two queue groups 810 and 816, even though physically separated, together form a single queue for target location 802. It should be noted that while there are two queue groups each with three queue locations, any number of queue groups having any number of queue locations may be used in accordance with the disclosure herein.

Just as with FIG. 9, in the example of in FIG. 11, assuming the target location 802 (labelled "T") is occupied by a robot being serviced at station 802, robots entering a predefined target zone 803, defined by a dashed-line, are assigned to queue locations based on priorities assigned to them by the system. Queue location 804, labelled "1", is the highest priority queue location. Queue locations 806-822 have lower/decreasing priority levels, as indicated by their labels "2"-"6". Thus, the robot with the first or highest priority to occupy the target location 802, when it is available, is directed to queue location 804, while the other robots are queued in the other queue slots based on their respective priorities. Priorities may be determined by the order of the robots' entry into the predefined target zone. In other words, the earlier the entry into the target zone, the higher the assigned priority for the robot and thus the lower the queue number.

The assigned priorities may be established in other ways. For example, instead of or in combination with the time of entering into the target zone, priority can be assigned based on the customer order to be processed by the robots. The customer order for each robot may be assigned a priority based on one or more of the following criteria: shipping priority, item type, customer type, or retailer, for example. Customer orders with expedited delivery or preferred customers may be assigned a high priority and therefore be placed in higher priority queue locations to ensure faster processing. Similarly, certain products or retailers could be given priority based on contractual relationships. The priority of the customer order alone or in combination with the priority based on the time of entering into the target zone may be used to assign priority and hence queue location to the robots vying for the common target location.

Continuing to refer to FIG. 11, there are shown two robots 824 and 826 which have entered the predefined target zone 803. Robot 824 has been assigned a priority of (1,B) and robot 826 has been assigned a priority of (2,A). In this example the first priority criteria is numerical and indicates the order in which the robots entered the target zone 803, i.e. robot 824 entered first and robot 826 entered second. If the order of entry was the only criteria, robot 824 would be assigned to queue location 804 and robot 826 would be assigned to queue location 806. However, in this example there is a second criteria related to the customer order, e.g. shipping priority, item type, customer type, or retailer. Robot 824 has been assigned a "B" priority regarding its customer order while robot 826 has been assigned an "A" priority. In this example, the customer order priority trumps the order of entry into the target zone so, as indicted by lines 825 and 827, robot 824 is directed to queue location 806 (location "2") and robot 826 is directed to queue location 804 (location "1").

This above example is just one simple example of priority assignment and any suitable method for assigning priority may be used in connection with this invention using the standard queue shown in FIG. 9, the split queue of FIG. 11 and the shared/split queues described below in FIGS. 12 and 13.

Figure 12:
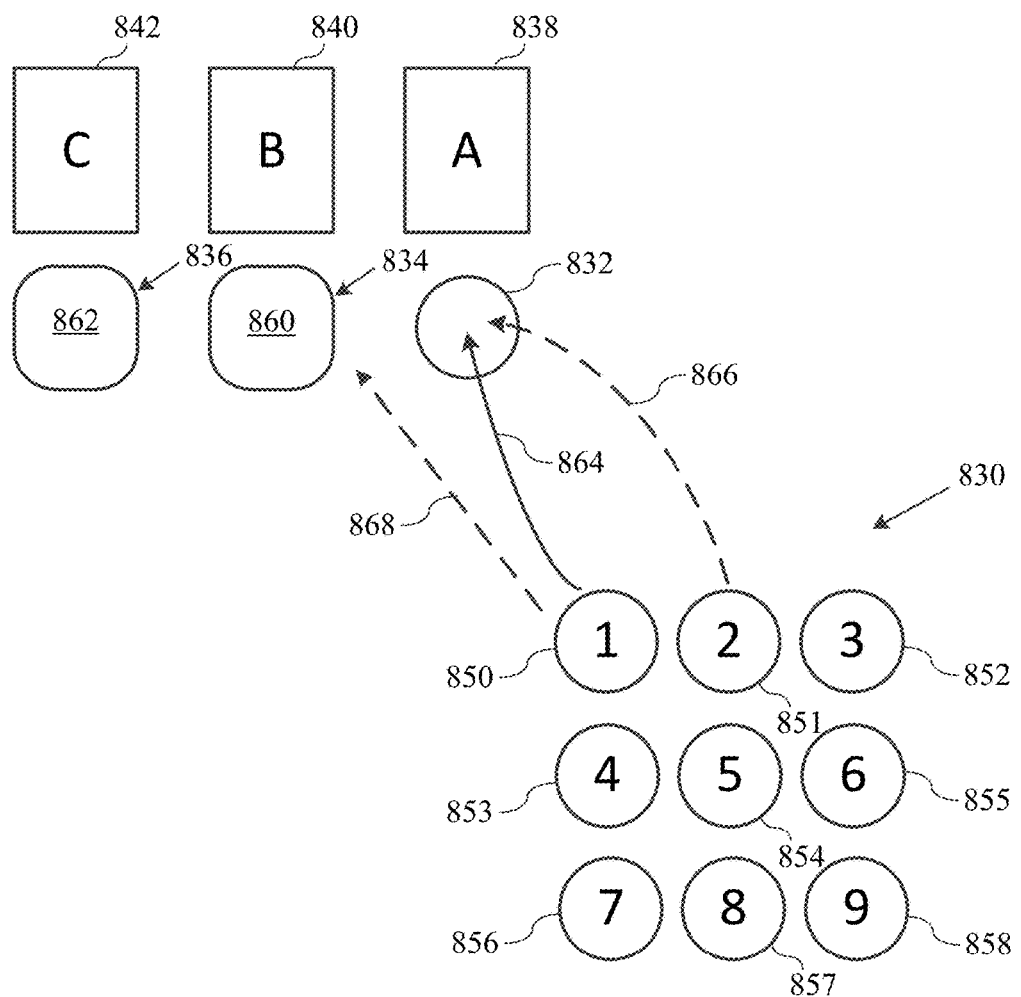
FIG. 12 is a schematic view of the target and queue locations in another aspect of queuing process according to this invention in which a shared queue is used.

In another embodiment, shown in FIG. 12, another aspect of the disclosure is described. Here, a "shared" queue 830 may be used. What is meant by "shared" in this context is that queue group 830 is shared among a number of target locations, such as target locations 832, 834, and 836, which are associated with and proximate to stations 838, 840, and 842, respectively. Robots that are destined for any of target locations 832, 834 or 836 are directed to one of the queue locations 850-858, which have priorities 1-9, respectively. This means that queue location 850 (priority "1") is the location where the robot with the highest priority would be located irrespective of the target location for which it is destined and queue location 9 (priority "9") is the queue location where the robot with the lowest priority would be directed.

Stations 838 ("A"), 840 ("B"), and 842 ("C"), may be configured to perform the same or different functions. For example, the may all be configured as induction stations or packing stations or they may be configured as a combination of induction and packing stations. Moreover, any number of stations and any number of queue locations in queue group 830 may be used. In one scenario, stations 838, 840, and 842 may be configured such that any robot in the queue locations can proceed to any target location/station. In that case, as indicated by solid line 864, a robot positioned in queue location 850 would proceed to the first available target location which in this example is target location 832. Target locations 834 and 836 are shown to be occupied by robots 860 and 862, respectively. The robots in the other queue locations will all move up to the next highest priority queue location.

Alternatively, for various reasons, certain robots may only be able to proceed to certain stations/target locations. This scenario is depicted in FIG. 12 by the dashed line 866, which shows the robot in queue location 851 (priority "2") proceeding to open target location 832 instead of the robot in queue location 850 (priority "1"). This may be because the robot at queue location 850 is not able to be serviced by station 838 (e.g. the robot needs to be inducted but station 838 is dedicated to packaging/delivery). As shown by dashed line 868, when robot 860 leaves target location 834 (assuming that robot 860 leaves before robot 862), the robot at queue location 850 will proceed to target location 834 to be serviced by station 840.

Figure 13:
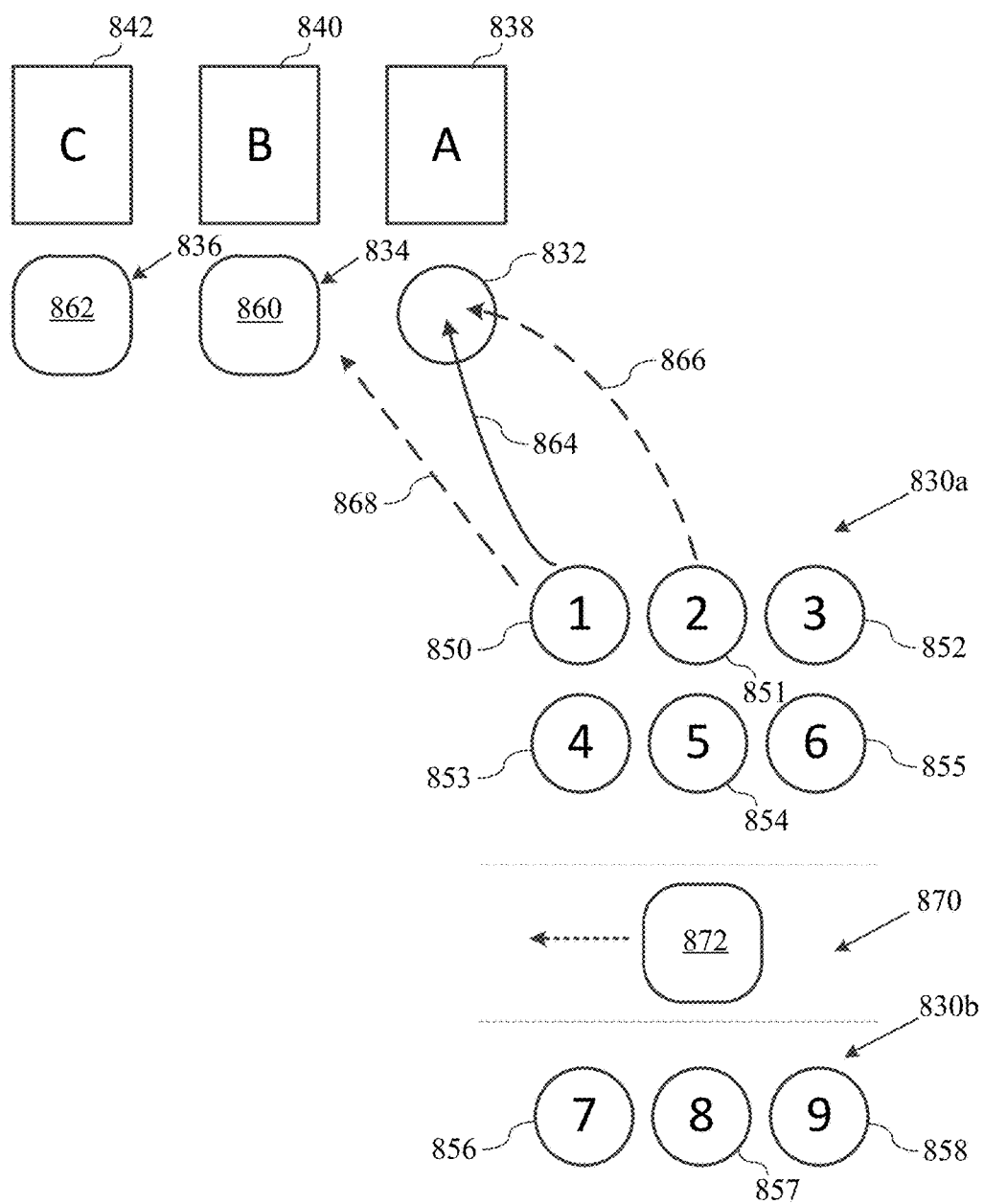
FIG. 13 is a schematic view of the target and queue locations in another aspect of queuing process according to this invention in which both a shared queue and split queue are used.

In yet another embodiment, there is shown in FIG. 13 the shared queue 830 of FIG. 12 divided into a split queue having queue groups 830a and 830b. This shared queue will operate in the same manner as the shared queue 830 of FIG. 12; however, it is split into two queue groups due to the proximity of path 870, which is traversed by operators and robots, such as robot 872. The first queue group 830a has queue locations 850-855 on one side of path 870 and a second queue group 830b has queue locations 856-858 on the opposite side of path 870. The queue locations in the two queue groups 830a and 830b, even though physically separated, together form a single queue for target locations 832, 834, and 836.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is:

We claim:

1. A method for queuing mobile robots destined for one or more occupied target locations in a warehouse space a, comprising:
   determining if a plurality of mobile robots moving toward the one or more occupied target locations in the warehouse space have entered a predefined target zone proximate the one or more occupied target locations; and
   causing each of the plurality of mobile robots to move to and occupy one of a plurality of queue locations in the warehouse space based on an assigned priority; wherein the assigned priority is determined by one or both of the order of entry of each of the plurality of mobile robots into the target zone and an order priority associated with a customer order to be processed by each of the plurality of mobile robots;
   wherein the plurality of queue locations are grouped into one or more queue groups spaced from the one or more target locations in the warehouse space.

2. The method of claim 1 wherein the warehouse space contains items for customer order fulfillment.

3. The method of claim 1 wherein the assigned priority is determined by the order of entry of each of the plurality of mobile robots into the target zone, and wherein the first mobile robot to enter the target zone is assigned the highest priority.

4. The method of claim 1 wherein the order priority associated with the customer order to be processed by each of the plurality of mobile robots is determined by one or more of the following: shipping priority, item type, customer type, or retailer.

5. The method of claim 1 wherein the plurality of queue locations are grouped into at least two queue groups spaced from each other in the warehouse space.

6. The method of claim 5 including a first plurality of queue locations in a first queue group and a second plurality of queue locations in a second queue group, wherein the first plurality of queue locations in the first queue group and the second plurality of queue locations in the second queue group are all associated with one target location in the warehouse space.

7. The method of claim 1 wherein the plurality of queue locations are grouped into one queue group and the plurality of queue locations are associated with a plurality of target locations in the warehouse space.

8. The method of claim 5 including a first plurality of queue locations in a first queue group and a second plurality of queue locations in a second queue group are associated with a plurality of target locations in the warehouse space.

9. The method of claim 1 wherein the one or more target locations and the plurality of queue locations are each defined by a pose to which the mobile robot is capable of navigating.

10. A mobile robot capable of navigating to predefined locations in a warehouse space containing a plurality of other mobile robots, the mobile robot and the plurality of other mobile robots capable of interacting with a management system, the mobile robot comprising:
   a mobile base;
   a communication device enabling communication between the mobile robot and the management system;
   a processor, responsive to communications with the management system, configured to:
      navigate the mobile robot to a target location in the warehouse space;
      determine if at least one of the plurality of other mobile robots occupies the target location;
      if it is determined that at least one of the plurality of other mobile robots occupies the target location, determine if the mobile robot has entered a predefined target zone proximate the target location;
      if it is determined that the mobile robot has entered the predefined target zone, cause the mobile robot to move to and occupy one of a plurality of queue locations in the warehouse space based on an assigned priority; wherein the assigned priority is determined by one or both of the order of entry of the mobile robot relative to each of the plurality of other mobile robots into the target zone and an order priority associated with a customer order to be processed by the mobile robot and each of the plurality of other mobile robots; and wherein the plurality of queue locations are grouped in one or more queue groups spaced from the one or more target locations in the warehouse space.

11. The mobile robot of claim 10 wherein the warehouse space contains items for customer order fulfillment.

12. The mobile robot of claim 10 wherein the assigned priority is determined by the order of entry of the mobile robot and each of the plurality of other mobile robots into the target zone, and wherein the mobile robot to enter the target zone first is assigned the highest priority.

13. The mobile robot of claim 10 wherein the order priority associated with the customer order to be processed by the mobile robot and each of the plurality of other mobile robots is determined by one or more of the following: shipping priority, item type, customer type, or retailer.

14. The mobile robot of claim 10 wherein the plurality of queue locations are grouped into at least two queue groups spaced from each other in the warehouse space.

15. The mobile robot of claim 14 including a first plurality of queue locations in a first queue group and a second plurality of queue locations in a second queue group, wherein the first plurality of queue locations in the first group and the second plurality of queue locations in the second queue group are all associated with one target location in the warehouse space.

16. The mobile robot of claim 10 wherein the plurality of queue locations are grouped into one queue group and the plurality of queue locations are associated with a plurality of target locations in the warehouse space.

17. The mobile robot of claim 14 including a first plurality of queue locations in the first queue group and a second plurality of queue locations in a second queue group are associated with a plurality of target locations in the warehouse space.

18. The mobile of claim 10 wherein the one or more target locations and the plurality of queue locations are each defined by a pose to which the mobile robot is capable of navigating.

* * * * *